United States Patent
Dronzek, Jr.

(10) Patent No.: US 10,688,754 B1
(45) Date of Patent: Jun. 23, 2020

(54) MULTIFUNCTIONAL CONTACT CLEAR FILLED PRESSURE SENSITIVE ADHESIVE COATED SUBSTRATES

(71) Applicant: Polymeric Converting LLC, Enfield, CT (US)

(72) Inventor: Peter J. Dronzek, Jr., New Milford, CT (US)

(73) Assignee: POLYMERIC CONVERTING LLC, Enfield, CT (US)

(*) Notice: Subject to any disclaimer, the term of this patent is extended or adjusted under 35 U.S.C. 154(b) by 0 days.

(21) Appl. No.: 15/040,922

(22) Filed: Feb. 10, 2016

Related U.S. Application Data

(60) Provisional application No. 62/114,514, filed on Feb. 10, 2015.

(51) Int. Cl.
| | | |
|---|---|---|
| *B32B 7/12* | (2006.01) | |
| *B32B 37/12* | (2006.01) | |
| *B32B 9/02* | (2006.01) | |

(52) U.S. Cl.
CPC .......... *B32B 7/12* (2013.01); *B32B 9/02* (2013.01); *B32B 37/12* (2013.01); *B32B 2315/16* (2013.01); *B32B 2367/00* (2013.01); *B32B 2519/00* (2013.01)

(58) Field of Classification Search
CPC .. B32B 9/02; B32B 9/048; B32B 7/12; B32B 37/12; C09J 2201/606; C09J 7/0207; C09J 2203/334
See application file for complete search history.

(56) References Cited

U.S. PATENT DOCUMENTS

| | | | | |
|---|---|---|---|---|
| 4,710,536 A | * | 12/1987 | Klingen | C09J 133/08 524/493 |
| 6,503,620 B1 | * | 1/2003 | Xie | B32B 7/06 427/208.4 |
| 2004/0127614 A1 | * | 7/2004 | Jiang | C08F 10/00 524/270 |
| 2005/0110898 A1 | * | 5/2005 | Ryu | H04N 1/00885 348/372 |
| 2012/0028020 A1 | * | 2/2012 | Utesch | C08G 18/10 428/220 |
| 2012/0045604 A1 | * | 2/2012 | Gavel | G09F 3/10 428/41.8 |
| 2014/0045976 A1 | * | 2/2014 | Lux | C09J 113/02 524/27 |

* cited by examiner

*Primary Examiner* — Philip C Tucker
*Assistant Examiner* — Jimmy R Smith, Jr.
(74) *Attorney, Agent, or Firm* — Hedman & Costigan, P.C.; James V. Costigan; Kathleen A. Costigan

(57) ABSTRACT

A contact clear, durable heat resistant single ply low cost packaging or labeling substrate having: (a) a clear heat resistant film selected from polyester films and cellulosic films having a top and a bottom surface and (b) a pressure sensitive adhesive layer on the bottom surface of the clear heat resistant polymer film that has a pressure sensitive adhesive and an amount of a solid filler which is effective to reduce oozing when the label substrate is passed through a high temperature printer.

8 Claims, 1 Drawing Sheet

MULTIFUNCTIONAL CONTACT CLEAR FILLED PRESSURE SENSITIVE ADHESIVE COATED SUBSTRATES

FIELD OF THE INVENTION

This invention relates to a multifunctional contact clear filled pressure sensitive adhesive and clear film substrate combination that is lower cost, more efficient to convert and can be printed by conventional printing techniques as well as variable imaging using electronic toner technologies that impart significant heat to the substrate.

BACKGROUND OF THE INVENTION

The present invention relates generally to printable and electronically imagable pressure sensitive adhesive (PSA) substrates for tapes and labels that have the multi-functional properties of contact clarity, optional clean removability, heat stability, printable by conventional or electronically imagable techniques and incorporate a filled adhesive for enhanced ooze resistance and cost reduction. In a preferred embodiment, the substrate comprises a single ply material that is manufactured from a clear layer of heat resistant film that is coated with a pressure sensitive adhesive filled with inorganic or organic particles that is contact clear and mounted to a release liner backing. An example of where this invention could be used is a laser printable label that is first printed with fixed information using conventional flexographic printing techniques before the label is die cut into sheets of discrete labels for subsequent laser printing of variable information. These labels made from a single ply of thin clear film substrate coated with a filled contact clear pressure sensitive adhesive for example could be used in bar coding and price marking applications replacing clear vinyl or polyester films with non-filled adhesives. Vinyl films will melt if they jam in the fuser of a laser printer used in the current art.

Most preferably, the invention relates to a novel single ply substrate that uses a low cost clear heat resistant printable film substrate and a multi-functional contact clear filled pressure sensitive adhesive coating that is rendered removable through the incorporation of particles into the adhesive polymer.

The labels of the current invention can be used as lower cost heat resistant contact clear film labels in applications where a heat resistant label is needed, especially in variable imaging processes such as laser printers employing heat fused toner technology. Printed labels comprise an important form of communication for permanent and temporary labeling of various items. Labels are commonly used to convey information in a wide range of applications. While this invention is not limited to any specific market area that would use a contact clear heat resistant label and this disclosure is in no way meant to be limiting, shelf labels used in the retail environment familiar to all will be used for illustrative purposes.

For example, in the retail environment, labels are commonly applied to product displays to identify objects and to convey information about those objects to customers such as pricing, product identification, sale details, etc. Product information tends to be dynamic in in this environment and product offerings and pricing undergo frequent changes. Point-of-sale product labeling is often changed by applying new labels to the edge of shelves on which the products are displayed. Such shelf labeling is a significant part of the labeling activity in commercial retail establishments and large numbers of labels are used today in retail outlets for shelf edge price marking and promotional labels called shelf talkers.

The typical retail market includes aisles of shelves on which identification and price labels are affixed using a pressure sensitive adhesive on the back side thereof which forms a removable bond with the shelf edge.

A shelf talker is a special type of product label used for promoting brand identity, units of measure, price comparisons, and special sale pricing and promotions. The shelf talker is usually larger than the shelf label, and is used in addition thereto for increasing the visibility of the particular product being promoted. Shelf talkers are normally larger than a price marking label and are made of clear film that is placed over the price marker label and is designed to be removable from the base price label and shelf edge the contact clear label is applied over.

Labels with variable imaging are typically provided in groups of similar die cut size on individual sheets for collectively printing the desired information thereon. Fixed information, such as store identification and product graphics can be pre-printed in large quantities of the sheets in a suitable manner during the production of the die cut labels and variable imaged at a later time or die cut blank labels can be produced that are imaged with fixed and variable information at a later time. Variable information is printed on a common sheet such as the specific product, size, price or promotion information may be locally printed at a service bureau or distribution center that will distribute the labels or they can be printed on-demand at store level using laser, thermal transfer and direct thermal printers.

Due to their temporary disposable nature in use, shelf labels must be easy to produce, install, remove and be durable to withstand the rigors of the application such as cleaning with various hard surface cleaners. Cost is always a significant factor for the substrate material.

Lighter weight functional substrates are preferred for reduced shipping and distribution costs. Since many prices and promotions change weekly, new shelf edge labels and shelf talkers are typically sent out by courier. Couriers are now migrating to "Conventional Packaging" where you pay a fixed price for a certain size package with fixed dimensions and an upcharge for excessive weight. A thinner composite of face stock, adhesive and liner will allow for more labels in a box and assist in reducing distribution costs under the new dimensional packaging pricing now used as a standard by most courier services. Because of the sheer volume of these types of labels that are consumed, an environmentally sustainable substrate is preferred.

DESCRIPTION OF THE PRIOR ART

Clear pressure sensitive film labels for use in printers that require a high temperature substrate that will not soften, melt or curl in the printer apparatus such as a laser printer are typically produced with either heat resistant clear polyester film (PET) label face stock in the 0.002-0.003' thickness range, clear flexible or rigid cast vinyl in the 0.003-0.004" thickness range. Polyester has the heat stability to transport and process through hot running printers like the typical laser printer. Cast vinyl label substrate that is much more heat sensitive requires a heavy basis weight removable paper backing to absorb the heat shock as the material is being processed in a laser printer such as the typical 70-90# poly coated liners that range in thickness from 0.005-0.008" in thickness range. Oriented polypropylene (OPP) does not have the heat stability for hot laser printers because when exposed to high heat, the substrate tend to slightly shrink back to its pre-oriented (pre-stressed) state causing curl of the pressure sensitive laminate. Additionally, OPP will melt if there is a jam in the fuser section of a laser. While OPP is not recommended for use in laser printers, the invention can be practiced for contact clear OPP labels that are not exposed to heat that will approach the softening point of OPP. PET, Vinyl and OPP can be used in other variable imaging techniques such as direct thermal, thermal transfer, ink jet, wet toner technologies and toner new generation toner technologies with colder toner fusion mechanisms.

SUMMARY OF THE INVENTION

The invention provides a contact clear, durable, heat resistant single ply transparent low cost packaging or labeling substrate comprising:(a) a clear heat resistant film selected from the group consisting of thermoplastic polyester or polypropylene films and thermoset cellulose films having a top and a bottom surface; (b) a pressure sensitive adhesive layer on said bottom surface of said clear heat resistant polymer film that comprises a pressure sensitive adhesive and an amount of a solid filler which is effective to reduce adhesive ooze and creep when said label substrate is wound in rolls, stacked in sheets or passed through a high temperature printer.

The solid filler may be alumina tri-hydrate, clay, starch or mixtures containing two or more of these materials.

According to the present invention, a durable heat resistant single ply transparent low cost packaging film substrate comprising an Oriented Polyethylene Terephthalate film (OPET), Oriented Polypropylene film (OPP_ or a Cellulose film (Regenerated Cellulose) film is coated with a particle filled pressure sensitive adhesive composition containing sufficient filler that results in the formation of a lower cost contact clear, ooze resistant flexible label substrate. The label substrate has a top surface and a bottom surface where the top surface is printable or can be coated with a functional coating for specific printing techniques and the bottom surface has the filled contact clear pressure sensitive adhesive supported on a release liner backing. The functional coatings include resins formulated to receive various types of inks (solvent, aqueous, UV) and variable imaging toners such as those used in laser imaging devices.

The substrates of the present invention are used in conventional printing and dry or wet toner technology printing systems for variable information such as dry toner laser systems produced by Xerox Corporation, Lexmark, Ricoh, Xiekon and Hewlett Packard and wet toner systems such as the Indigo system produced by Hewlett Packard. The heat fusing of the dry toner technologies requires the use the high temperature substrates with high softening points and dimensional stability at elevated temperatures. These laser systems typically operate at temperatures of 180° C. to 220° C. In cold or flash fusion laser systems, Oriented Polypropylene can be used.

In terms of thickness, the substrate including the film and contact clear pressure sensitive adhesive should have a combined thickness from about 0.0015" to 0.005" and preferably about 0.0015" to 0.003" for ease of hand application of the label and subsequent removal. For automatically dispensed and applied labels, the combined thickness should be 0.002" or greater.

Accordingly, it is an object of the invention to provide a lower cost and more functional label stock for use in printing applications that require a contact clear tape or label substrate that increases printing efficiency by creating a thinner substrate, adhesive and liner combination so more footage can be supplied on a roll and more sheets can be in a stack. A filled adhesive that has less cold flow, ooze and creep allows for the use of a thinner substrate that is lower cost per unit area.

Surprisingly, the filler particles inhibit adhesive migration also known as ooze, creep and cold flow. Without being bound by any theory of operation, It is believed that the inhibition of adhesive migration results because the pressure sensitive adhesive polymer becomes bonded to the high particle surface area of the filler that is present in the coating matrix. The combination of the pressure sensitive adhesive and the filler results in the inhibition of the flow properties of the pressure sensitive adhesive. This inhibition is seen at room temperature with or without pressure since the mass of mobile polymer available to ooze, creep or cold flow at room temperature or in processing is minimized. The particles reinforce the adhesive in a manner that is analogous to the effect that the presence of gravel in concrete provides a reinforcing effect. Because the migration of a filled adhesive outside the bounds of the label or tape edges is greatly reduced as compared to what is observed with non-filled adhesives under temperature and pressure, there is a reduction in the tendency to block or edge weld between the tape and label sheet edges which allows for the use of thinner face stocks. In the prior art, adhesive oozing is typically overcome by using thicker substrates to provide greater separation to minimize adhesive contact and blocking between the adhesive at the tape or label edge and back side of the next substrate construction that is either adhesive wound on top of the substrate in the case of a tape or the back side of a release liner wound on top of a substrate in rolls or cut stacked sheets.

DETAILED DESCRIPTION OF THE INVENTION

Figure 1:
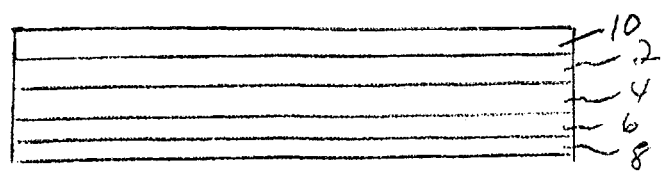
FIG. 1 is a diagram of a cross-section of the layers of the contact clear pressure sensitive substrate having a print receiving top coating 2 on a clear heat resistant film 4 on a contact clear filled pressure sensitive adhesive having a filler 6 in contact with optional release liner 8 with printed indicia 10 on the surface of print receiving coating 2.
Figure 2:
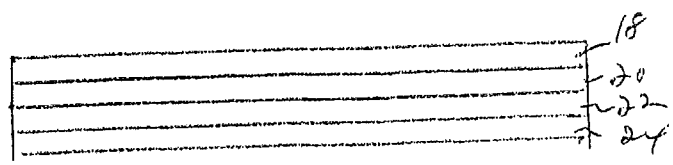
FIG. 2 is a diagram of a cross-section of an embodiment of the invention where the printed indicia is applied between the clear heat resistant film and the contact clear filled pressure sensitive adhesive layer. The clear heat resistant film 18 is positioned over the coated or printed indicia 20 which is positioned over the pressure sensitive adhesive having a filler 22 which is in contact with optional release liner 24. The printed indicia may be reverse printed on the clear heat resistant film

The present invention provides for a contact clear heat resistant removable pressure sensitive tape or label substrate that is based on heat resistant transparent film coated with a multi-functional pressure sensitive adhesive. The multi-functional properties of the filled adhesive heat resistant substrate are contact clarity, heat stability, printability by conventional or electronically imagable techniques, enhanced ooze, cold flow and creep resistance along with cost reduction. The adhesive polymer with filler can optionally be formulated to provide a permanent or removable bond.

The filled contact clear adhesive not only provides the adhesive properties for the affixing functionality of the tape or label, but also provides the ability to use a thinner heat resistant substrate. The addition of filler to the adhesive reduces adhesive cold flow, creep and ooze due to the reinforcing effect of the added filler. This allows for a thinner substrate to be used because the adhesive will have a lower tendency to block at the edges since the adhesive does not flow out from under the edges of the substrate as readily. The adhesive coated film is mounted to a release backing for label and some tape applications and can also be wound against the opposite side of the substrate with or without a release coating or layer for tape applications depending on the adhesive formulation.

The terms clear film and transparent film for purposes of this specification are used interchangeably to define a film substrate that allows light to pass through where objects held up against the back surface can be clearly seen.

Oriented Polyester Film as discussed in this application is also denoted OPET. Poly vinyl chloride film (PVC) is also denoted as vinyl film. The Vinyl film can be rigid or flexible with the incorporation of plasticizers. Polypropylene film can be denoted OPP for oriented polypropylene film or CPP for cast polypropylene film. The single ply film substrate of the present invention can be mono-layer or multi-layer melt fused coextruded substrates that make up the contact clear transparent film layer.

Pressure sensitive adhesive is defined as a dry adhesive coating that is tacky at room temperature and will stick firmly to the surface to which it is applied with pressure. It can include water based acrylic or rubber based adhesives where the water carrier is driven off, solvent based adhesives where the solvent carrier is driven off, rubber, resin and oil based hot melt adhesives and 100% solids energy cured liquid adhesives applied at room temperature or elevated temperature.

Contact clarity is defined as the transparency to clearly view the graphics below the film and adhesive of the present invention when applied over a printed image using the filled pressure sensitive of the current invention. Contact clarity also will provide the no label look where the shade of the item covered with the substrate and adhesive of the present invention looks approximately the same in a non-covered area.

Heat stability for the present invention means that the substrate and adhesive of the present invention when mounted to a release liner will process through laser printers used in the current art without melting, shrinking and jamming in the printer due to distortion of the face stock or ooze of the adhesive under the printing conditions.

Printable by conventional techniques means the substrate can be printed by gravure, flexographic or offset printing techniques directly or through the use of a print receiving primer.

Electronically imagable printing techniques means printable by Ink Jet, Toner Technology (laser dry toner or Indigo wet toner), thermal transfer or direct thermal directly or through the use of a print receiving coating designed for the specific electronic imaging technology.

Adhesive tack is the sticky property of the adhesive coating measured by the peel force from a substrate.

Filler is defined as an inert substance added to polymers. Adding fillers to a pressure sensitive polymer modifies the mechanical properties of the adhesive matrix and reduces cost. Fillers can be inorganic or organic.

A filled pressure sensitive adhesive of the current invention means solvent based, aqueous based, 100% solids energy curable or a hot melt adhesive system based on synthetic or natural polymers such as acrylic and rubber based adhesive polymers formulated with the addition of inorganic or organic particles that do not impact contact clarity of the adhesive due to the choice of the particle and/or addition level but do modify the adhesive properties of the polymer adhesive base the particles are added to. The modifications to the adhesive due to particle addition are an increase in the shear strength, reduction in the cold flow, creep or ooze properties of the adhesive and a reduction in the tack of the adhesive. The degree of tack reduction is dependent on the choice of the adhesive polymer, filler particle and filler loading.

Adhesive, ooze, cold flow or creep resistance means that the filled pressure sensitive adhesive is less prone to building up on cutting dies, resists cold flow under pressure such as when wound in a roll, resists oozing under the weight of stacks of sheets and does not ooze in individual sheets fed through the hot fusing section of a laser printer as the adhesive gets softer when heated.

Cold flow or adhesive creep is the shifting (flow) of adhesive that bonds the substrate to the release liner due to conditions that exceed the resistance limits of the adhesive used. Adding particles that reinforce the adhesive increases the flow resistance limit.

Cold Fusion laser printers systems typically run continuous forms and employ lower temperature toner fusing technology and have a chill plate after heat fusing the toner to cool the substrate.

Flash Fusion laser printers systems typically run continuous forms and employ lower temperature fusing technology and heat fuse the toner with a flash of energy so the fusing section is not always up to temperature and transfers much less heat to the substrate versus systems where the fuser is always at temperature. Typical systems use a Xenon lamp light source as the fusing mechanism to provide the heat energy to melt fuse the toner.

Cost reduction for purposes of this invention is achieved in multiple ways. First is the reduction in the cost of an adhesive by replacing higher cost polymer solids with lower cost filler solids. Additionally, removable adhesives without filler are more highly engineered and more costly. It is an object of the present invention to start with a lower cost permanent adhesive polymer and convert it to a lower cost removable coating through the addition of filler. Next is the ability to use a thinner gauge base film because the filled adhesive has improved properties of less cold flow, creep or ooze reducing substrate cost per area. Additionally are the efficiency savings from converting and printing material with more footage on a roll or sheets in a stack and lastly there are cost savings in freight.

The phrase dried adhesive layer means the resulting adhesive layer after water or solvent is evaporated from an aqueous or solvent based adhesive respectively or it is the 100% solids layer of a non-molten hot melt or crosslinked energy curable adhesive matrix.

In one embodiment, the substrate of the invention is made from a clear heat resistant mono or multi-layer film that can be coated with primer or corona, flame or plasma treated to promote adhesion of the adhesive or functional print coating. The preferred film substrate for use in this invention will have a softening point greater than 200° C. and more preferably greater than 225° C. (as determined using ISO 306). The preferred thermoplastic film based on the temperature requirement and cost is clear packaging or industrial grade oriented polyester (OPET) available from various commercial sources such as Toyobo, Osaka, Japan, Shinkong Synthetic Fibers, Taipei or Toray Plastics, North Kingston, R.I. Oriented PET has low thermal shrinkage. The Toyobo Technical Data Sheet dated December 1986 is incorporated by reference. OPET has a melting point of >250° C. which is more than sufficient for hot running laser printers. Other thermoplastic films such as a polyolefin the oriented polypropylene (OPP) can only be considered for the present invention if the printing technique used has a process temperature lower than the softening point of the OPP so it can be processed. For example Polypropylene, one of the higher heat resistant members of the Polyolefin family has a melting point of 166° C. and cannot be used in in hot running laser printers but can be used in cold fusion or flash fusion laser systems as well as thermal transfer or direct thermal printers. The cost reductions, adhesive ooze, cold flow and creep resistance benefits detailed for laser printers with hot toner fuser sections holds true for flash fusion laser, thermal transfer and direct thermal printing techniques.

Flexible cast plasticized vinyl (PVC) film that has good thermal heat shrinkage characteristics is one of the films that can be replaced by this invention and is available from PVC TECH Corp. Dominguez Hills, Calif. The typical 0.003-0.0035" flexible vinyl substrates on the market has good thermal shrinkage characteristics because it is cast without stress, it is marginal in laser printers and is problematic if it jams in the thermal fusing section as it starts to soften at temperatures greater than 140° C. and with a melting point around 200° C. In order to process through laser printers, the clear vinyl is typically mounted on a heavy basis weight paper liner that functions as a heat sink to absorb the heat shock of the fuser and support the softened vinyl on a rigid liner to allow the composite vinyl, adhesive and liner substrate to process through the printing equipment. The typical basis weight for a paper liner that allows the vinyl to process is greater than 70# weight. The present invention will allow for lower basis weight, thinner liners to be used which translates to a lower cost of raw materials, increased footage on a roll and more sheets in a stack increasing the efficiency of converting and printing the stock. Utilizing a lower basis weight paper liner also results in sustainability gains because fewer trees will need to be harvested.

PVC also is not environmentally friendly and in many jurisdictions around the world, its use is being limited because phthalate compounds are used as plasticizers to make flexible PVC compounds soft and conformable that can leach out of the material over time. Burning PVC can release small amounts of dioxin compounds that are created any time a compound containing chlorine is burned as well as hydrochloric acid. PVC should not be burned but labels do make it into the waste stream because there is no recycling program that separates labels from containers before they are incinerated or sent to a land fill.

As a preferred flexible substrate for this invention, Cellulose film that is produced from regenerated wood pulp is an excellent option because it is a thermoset film and does not melt. Cellulose film also has high stiffness at thin gauges and will allow for thin films to be used and easily handled. Cellulose film is produced from wood pulp from managed tree farms so it is sustainable. While Cellulose film is clear and has many of the properties of a synthetic thermoplastic film such as OPET, Cellulose film is made from regenerated cellulose derived from wood and the only commonality is that both products can be manufactured as a transparent film. Cellulose films are available in coated and uncoated formats from Innovia Films, Smyrna GA under the trade name Cellophane™ and Futamura Chemical Co., Ltd, Osaka Japan. Cellulose film has excellent clarity, heat resistance and strength but can tear easily and is moisture sensitive unless it is coated to seal it and inhibit or block moisture transmission.

Oriented polyester and cellulose film are stiff and in applications where flexible vinyl would be used, a much thinner OPET substrate nominally in the range of 0.00055" to 0.0018", and preferably about 0.0007" to 0.0012" and most preferably about 0.0015" can be used to match the hand of a 3 mil flexible vinyl. The ability to use a thinner film substrate allows for cost savings due to the higher yield of a thinner film nominally in the range of 0.00075" to 0.0018", and preferably about 0.0015" can be used to match the hand of a 3 mil flexible vinyl. The cost savings is not only in the cost of the label substrate components because more footage can be on a roll to be printed, die cut or laser printed or more sheets can be in a stack for greater converting efficiency. More substrate area per pound of film is shipped drives freight costs savings that accumulate starting with shipment from the film manufacturer, then from the adhesive coater, then from the converter and finally the shipment to the end use location.

Cellulose film is receptive to many types of coating and adhesive polymers and can be sourced with many different surface treatments such as acrylic coatings to promote adhesion of inks and plastics, PVDC coatings for barrier properties, nitrocellulose coatings for sealing and surface modification and other types of functional coatings. The Innovia Films brochure "Cellulose Films Product Range for Packaging" (dated August 2012) is hereby incorporated by reference.

The contact clear filled pressure sensitive adhesive of the current invention is multi-functional. Not only does it perform as a pressure sensitive adhesive, it also provides contact clarity, optional clean removability, increased thermal heat stability, decreased adhesive ooze, creep and cold flow along with cost savings because filler solids are lower cost than polymer solids. When the contact clear filled adhesive of the present invention is combined with a transparent substrate, an improved contact clear tape or label base is created that is printable by conventional or electronically imagable techniques.

Adhesive performance is controlled by the choice of the base adhesive polymer or polymer blend in combination with the filler or filler blend used to create the contact clear adhesive matrix. Pressure sensitive substrates coated with a tacky pressure sensitive adhesive are coated in large master rolls that are either self-wound or mounted to release liner that are then at a later time slit into smaller rolls. Some of the slit rolls are then die cut if used as a label. By adding lower cost reinforcing particles to the adhesive while still providing a contact clear adhesive, lower cost pressure sensitive clear films can be produced by reducing the cost of the adhesive because filler solids cost less than adhesive polymer solids on a dry weight basis.

The incorporation of filler in the PSA layer also provides a range of benefits including faster drying due to higher solids adhesive formulations (less water or solvent to evaporate), improved converting, improved die-cut ability with less adhesive build up, lower cost and reduced edge flow (ooze, creep and cold flow) and edge welding.

Surprisingly, it has also been noticed that the clear heat resistant films have good stiffness and firm hand before they are coated with the filled adhesive layer but that after coating with the soft adhesive loaded with dense particles, the hand of the coated film is much softer and the coated film feels more flexible, conformable and less noisy when flexed. Rigid films coated with a thick soft dense coating tend to take on the characteristic of the applied coating. Hand in fabrics and films is related to the drape of the product and a soft hand is a soft drape. In this case, the density of the filled soft pressure sensitive polymer creates a softer hand of the label substrate. This is a desirable property for labels that need to drape or conform to irregular or curved surfaces.

While many types of particles can be used, especially if the filled coating is ground to control particle size, special mention is made of the preferred types of fillers to be used to create a contact clear filled adhesive that does not impart significant opacity and can be added directly to the adhesive polymer with dispersing aids without grinding for size reduction. Preferred are alumina tri-hydrate available from Bayer in <3 micron particle size, kaolin clay with a particle size less than 0.5 micron available from Burgess or BASF and starch in various grades and sizes (corn, potato, tapioca and other grades) available from Multi-Kern, Ridgefield N.J. either separately or in admixture.

The use of dispersing aids is critical for the proper dispersion of the selected filler into the polymer emulsion if an aqueous system or a solvent solution. Suitable dispersing aids for aqueous adhesives are Tamol 165A a sodium salt of maleic anhydride available from Dow Chemical, Midland, Mich. and Surfynol CT-136 an anionic/nonionic pigment dispersant and wetting agent that provides excellent milling, stabilization, and viscosity benefits in the dispersion of a wide range of pigment chemistries in aqueous systems available from Air Products & Chemicals, Allentown, Pa. The dispersing additives provide for good wetting of the filler by the polymer so that intimate contact between filler and polymer is maintained even when the material is deformed or exposed to water or other liquids or vapors.

Adding the proper choice of filler to a pressure sensitive polymer will make the coating matrix tougher due to mechanical coupling of the polymer and filler and will reduce the tack, adhesion, edge ooze, creep and cold flow properties of the adhesive while increasing the shear strength.

In labeling, typical adhesive thickness for labels being applied to smooth surfaces have an adhesive deposition from 0.0004 to 0.0012" (10-30.5 microns) in thickness and 0.001-0.0025" (25.4-63.5 microns) for more textured surfaces.

The preferred fillers for use to achieve the multifunctional benefits are inorganic mineral fillers such as alumina hydrate, kaolin clay and an organic particle like starch mentioned above but these are not meant to be limiting to those skilled in the art. Silica and other particles can be used.

When aqueous or solvent based polymers are used as the adhesive polymer of the invention, the filler particles, because of their size, the way they settle, pack and can protrude from the surface of the dry coating matrix formed by driving off the water or solvent carrier to form the dried pressure sensitive adhesive have an effect on the tack and peel values of the dry coating matrix. The effect on tack is principally moderated by the size and quantity of the particles.

If a 100% solids adhesive such as a rubber, resin and oil based hot melt adhesive or a 100% Energy Curable system is used, the particles will not protrude from the surface of the coating matrix formed by the 100% solids pressure sensitive adhesive loaded with particles and the particle loading will have less of an effect on the tack and peel strength of the coating matrix when the filled pressure sensitive coating is cooled in the case of a hot melt or cured in the case of an energy curable system. This means higher particle loading may be possible in the case of 100% solids systems with the amount of loading dictated by the coat weight needed for the end application, required peel and tack values and resultant contact clarity.

The pressure sensitive adhesive should be formulated so that a sufficient weight of filler having a predetermined particle size range is used that will provide adhesive on the polymer film that will provide a peel strength of 1.5 lb. to 3.5 lb./inch of width for a permanent adhesive and 0.2 lb to 1.5 lb./inch of width for a removable adhesive when measured using a 180° Peel Adhesion test using PSTC-1 protocol with 24 hour dwell from a stainless steel plate.

In calculating the amount of filler that is employed, the size of the particles is to be considered as the peel strength is affected by both the total weight of the filler and the size of the particles in the filler. The total weight of the filler should be in the range of about 3 to about 30 wt % and preferably from about 5 wt % to 15 wt %, based on the weight of the dry coating matrix. Some testing may be required to optimize the selection of the weight of the particular filler because of different specific gravities and the size of the particles required to achieve the desired peel strength.

The fillers used can be in the predetermined particle size range of 0.25-12 microns average particle size and preferably in the range of 0.4-6 microns and most preferably 0.4-4 microns. The selection of the particle size can depend on the thickness of the dried adhesive layer and the mean particle size should not exceed about 40% of the thickness of the dried adhesive layer and most preferably not exceed 15% of the thickness of the adhesive layer. There are two different techniques used to apply pressure-sensitive adhesive, direct coating onto the substrate and transfer coating the adhesive that is first coated onto the release liner and then laminated to the substrate. If the adhesive is less than 100% solids in a solvent or aqueous carrier, when it is dried, some of the particles depending on the size, shape and the way they pack will protrude from the exposed surface of the adhesive before lamination. If an adhesive with small particles is coated on the release liner or substrate and dried, the exposed adhesive surface is relatively smooth resulting in a surface suited for transfer lamination. For less than 100% solids adhesive formulations that use larger particles, the particles on drying will protrude further from the adhesive reducing the tack of the adhesive matrix making it more difficult to transfer laminate and also provides microscopic spacing for air entrapment when transfer laminated that reduces contact clarity, because the substrate, adhesive and surface to be bonded are all not in intimate contact. To maintain strong transfer lamination bonds or intimate contact with the surface to be bonded when direct coating the substrate, it is preferred that the filler particles size be less than 40% of the thickness of the adhesive layer thickness. For example, if the contact clear adhesive thickness is 20 microns thick the particle size must be smaller than 8 microns and preferably less than 4 microns so they do not excessively protrude out of the adhesive coating. The higher the particle loading and the more the particles stick out of the adhesive matrix drives the bond strength of the adhesive and the interfacial bond of the adhesive to the substrate if transfer laminating or to the surface to be bonded if direct coating the substrate. The greater particle loading or protrusion through the adhesive surface, the greater the tack and peel bond strength of the adhesive will decrease. It is a balance of particle size, loading and lamination technique (direct coat or transfer coat) to achieve the properties for a specific application.

For the best economics, it is preferred to be able to use as high filler loading as possible because filler solids are lower cost on a dry basis than polymer solids. Since filler deadens tack and peel properties of the adhesive, it is preferred to start with a more aggressive (tacky) adhesive that will allow for higher loading of filler.

In formulating the contact clear filled adhesive, it is preferable to use smaller particles but for removable applications, some larger particles protruding through the dry adhesive surface are acceptable as they aid in reducing surface tack for removability as long as the bond to the liner or clear film substrate is not undermined and the face stock does not separate from the liner through the various converting or printing processes.

Alumina trihydrate, starch and clay are suitable as fillers for this application when used alone or in combination because they do not provide significant opacity. Titanium dioxide, calcium carbonate and feldspar are not suited for this invention at the preferred addition ranges that provide the added functionalities to the adhesive polymer matrix because the adhesive will not be contact clear. Talc can provide the property of contact clarity but because of its platelet shape, it has a significant impact on adhesive polymer properties so only small amounts can be used in a blend with the preferred particles. Silica tends to build viscosity to unmanageable levels at the addition levels that provide the multi-functional benefits to the adhesive formulation and can only be used selectively. Glass or synthetic spheres whether solid or hollow tend to cause significant loss of adhesive properties as they penetrate the surface of the coating matrix and significantly reducing the surface area of contact of the adhesive and not suitable for this invention. Blends of the useful particles listed above can be used.

Small concentrations of colored pigments, dye or a combination of both can be used to color the adhesive coating forming a contact clear color are contemplated and will allow for increased customization of tinted film colors that are still contact clear. This can be readily accomplished with smaller volumes at minimal cost. With the ability to color the filled adhesive of the current invention, low cost customization is now possible using various pigment tint and dye concentrates available from Spectrachem, Lodi, N.J. such as Yellow 601 to produce a clear yellow tinted film starting with a clear film base.

Optical Brighteners such Leucophor BSB available from Clariant Corporation, Charlotte, N.C. can be used to impart optical brightness and non-yellowing characteristics on aging to the contact clear filled adhesive coating.

Pressure sensitive adhesive polymers that can be used to practice this invention are available from Momentive Performance Materials, Roebuck, S.C. under the Synthebond™ trade name, from Franklin International, Columbus, Ohio under the Covinax™ trade name, from Arkema, Cary, N.C. under the Encor trade name, Avery Dennison Performance Polymers Division, Mill Hall Pa. or Henkel Adhesives, Bridgewater, N.J. under the Gelva trade name. Specifically Synthebond 7201LSE is an aggressive adhesive polymer for low energy surfaces that can be compounded with fillers into a permanent contact clear adhesive and Synthebond 7701 can be compounded with fillers to produce a contact clear moisture resistant removable adhesive. Franklin Covinax 383 can be used to formulate a permanent or removable contact clear adhesive with the addition of fillers based on filler loading. Crosslinking agents such as those disclosed in U.S. Pat. No. 3,900,610, which is incorporated by reference, can be formulated into the contact clear adhesive to improve the toughness, durability and cohesiveness of the coating matrix as well as adhesion to the substrate if the contact clear adhesive is coated directly onto the substrate.

In a preferred embodiment, Avery Dennison E5590 permanent emulsion acrylic adhesive that has excellent cold temperature performance across a broad variety of substrates to be labeled including low energy substrates has been found to be an excellent choice as a base polymer for the removable filled contact clear adhesive of the current invention.

While the referenced adhesive systems are all aqueous based, this invention is not limited to the use of aqueous pressure sensitive adhesive systems and can use filled solvent based, 100% solids rubber+resin hot melt systems, 100% solids warm melt acrylic systems and 100% solids Energy Curable systems.

In addition, it is within the scope of the invention to utilize biodegradable and/or compostable pressure sensitive adhesives. Examples of these adhesives are found in US 2012/0045604, which is incorporated by reference. A commercially available product is DyTac 9577 which is sold by Dyna Tech Adhesives, Inc. Grafton, W. Va.

Slot coating equipment exists to apply multiple types of pressure sensitive adhesive s simultaneously. By incorporating a pattern shim into the individual slots of a multi-layer slot die, pattern layers of adhesive can be produced side by side adjacent to each other that would allow the creation of a combination contact clear and opaque label substrate by using a filled contact clear pressure sensitive adhesive from one slot and a pigmented high opacity pressure sensitive adhesive from another slot. Any example where this could be used is a shelf talker for advertising where the clear part of the label would overlay the product information label on the shelf in the clear area and the opaque part would hang off the shelf and display the advertising with an opaque background. While this can be accomplished now with a clear label stock with layers of ink applied on a printing press to create opacity in the desired area, it takes many of the thin ink layers to achieve acceptable opacity and ties up print stations needed to print other information. Accordingly, it is an object of the invention to create a heat resistant pressure sensitive film that optionally can have contact clear and opaque areas of adhesive in a machine direction pattern.

Optionally, the surfaces of the transparent film can be enhanced for printing or coating. This enhancement can come in basic forms such as corona, flame or plasma treatment in line with manufacturing or coating of the film to raise the dyne level of the surface and promote adhesion of the adhesive system or optional printable top coating.

A print receiving layer can be coated on the side opposite the filled contact clear adhesive side or can be coextruded in the manufacture of the film. If coextruded, the thickness of the layer can be from 1-12 microns thickness. If a coated layer, the coat weight can vary from 0.2-20 grams/MSI (MSI=1000 sq. in.) applied on the top surface of the polymer film. Examples of print receiving layers are as follows:

General purpose acrylic print primer BP9050 available from Process Resources Corp, Thornwood, N.Y. at 0.25-1.5 gram/MSI coat weight.

Laser Receptive receiver coating PD969LP containing Acrylic-Urethane with a kaolin clay matting agent available from Process Resources Corp., Thornwood, N.Y. at 1.0-2.0 grams/sq. m. coat weight. Special mention is made of this multi-functional coating when applied to Cellulose film which not only acts as a barrier to seal the moisture sensitive substrate but also imparts printability by conventional techniques and toner technology. This one coating system can replace a two coating system where one coating such as acrylic, PVC, PCDC or nitrocellulose is applied as a barrier to Cellulose film and then another coating for ink and toner receptivity is applied over it.

It is contemplated that additives to promote biodegradability and composting can be added to the top coatings without impacting the conventional ink and toner receptive properties of the Cellulose based tape or label substrate.

Various release liners can be used but a silicone release system is preferred on a low basis weight paper or film that will lay flat through the technique being used to print the substrate. Preferred release liners will be less than 0.005" in thickness and most preferably less than 0.0035" in thickness.

Example 1

In the lab a mixture was prepared as follows using a lab Cowles Dispersing mixer:
Ingredient wt %
E5590 Acrylic PSA 59.5% Solids 89.7
Tamol 165A Dispersant 0.8
CT136 Dispersant 0.4
Grade A202 2.5 micron Alumina Tri-Hydrate 8.8
Polyfunctional Aziridine CX-100/Water 50/50 Blend 0.3

The resultant coating at a nominal 67% solids was coated onto corona treated 0.0015" clear PET, 0.00087" 320 MF clear Cellophane coated with Nitrocellulose on both sides and 0.0011" Cellotherm P 400 uncoated Cellophane with a #20 lab metering rod and dried in a lab oven.

Adhesive thickness was measured at 0.0012". Samples were applied over printed graphics and to check for contact clarity and the underlying image came through clearly in all cases.

180° Peel Adhesion using PSTC-1 protocol with 24 hour dwell from stainless steel, treated PET sheet, non-treated Polypropylene sheet and Vinyl sheet. Peel values were measured at 1.2 #/in with minor cohesive failure of the adhesive from stainless steel, 1.6 #/in" with severe cohesive failure from treated PET, 0.45 #/in" from non-treated Polypropylene with adhesive failure and 1.5 #/in" from vinyl with severe cohesive failure.

The Uncoated Cellophane P 400 was noticeably distorted. This was attributed to the moisture sensitivity of the uncoated Cellophane that was saturated with 0.002" of wet adhesive and the extended period of time it takes to get the lab draw down sheet off of the draw down apparatus and into the lab oven. This does point out the moisture sensitivity of the uncoated Cellophane.

Example 2

The same coating mixture as Example 1 was prepared in a production environment and run on a pilot coating machine to emulate a production environment. The resultant coating at nominally 67% solids was diluted with water to nominally 62% solids to reduce the viscosity for better machining and was then coated by reverse-direct-gravure onto the same films used in Example 1 and laminated to 50# (0.0029") Clay Coated release liner designed for lay flat.

Corona treated 0.0015" clear PET 0.00087" 320 MF clear Cellophane coated with Nitrocellulose on both sides 0.0011" Cellotherm P 400 uncoated Cellophane Adhesive application was nominally 0.00067"

Samples were produced by direct coating on the substrate and transfer coating by coating the liner and then transfer laminating the dry adhesive to the substrate. 180° Peel Adhesion using PSTC-1 protocol with 24 hour dwell as above in Example 1 was performed from stainless steel using the 0.0015" PET samples that were direct and transfer coated.

The direct coated sample showed peel strength of 0.6 #/in with no cohesive failure and the transfer adhesive sample showed a peel value of 0.8 #/in. with no cohesive failure. The peel values are less than the same adhesive used in Example 1 attributed to the lower coat weight of Example 2. The difference in the peel values between direct and transfer coating is attributed to the rougher coating in direct coating from particles that protrude from the adhesive versus transfer coated adhesive that is smooth because the exposed surface was cast on smooth liner.

The Uncoated Cellophane P 400 was only slightly distorted when direct coated and was not distorted when transfer coated. This was attributed to the moisture sensitivity of the uncoated Cellophane that was saturated with the adhesive before drying.

Example 3

The sample rolls from Example 2 were coated with PD969LP laser toner receiver coating at 1 gram/MSI and tested through various laser printers. For toner adhesion and lay flat in processing. Color printers models were Lexmark C792de, Oki-Data C610, & C791, Hewlett Packard 11500 M551 and monochrome printers were HP LaserJet II and Brother 7820N.

Sample sheets of the raw Cellulose, Nitrocellulose coated Cellulose, PD969LP coated Cellulose (raw and over Nitrocellulose) and PD969LP coated PET were printed along with a clear 0.0035" Vinyl 1 sample on 0.007" liner representative of the current art was also evaluated side by side.

Print driver conditions were found to make excellent color and monochrome prints. The drivers had to be selected to impart less heat to the sheets because they are much thinner and could not handle the heat shock of the fuser temperature required to successfully print the vinyl structure that has much more mass to heat to fuse the toner. This is promising because energy costs will be lower and fuser life will be extended because it will not be running at maximum temperature all the time. None of the printed samples showed ooze, creep or cold flow.

Example 4

In the lab a mixture was prepared as follows using a lab Cowles Dispersing mixer:
Ingredient wt %
Encor 9285 Acrylic PSA 50% Solids 90.8
Tamol 165A Dispersant 0.8
CT136 Dispersant 0.4
ASP170 Kaolin Clay 0.4 micron 8.0

The resultant coating at a nominal 59% solids was coated onto corona treated 0.0015" clear PET, 0.00087" 320 MF clear Cellophane coated with Nitrocellulose on both sides and 0.0011" Cellotherm P 400 uncoated Cellophane with a #16 lab metering rod and dried in a lab oven. Adhesive thickness was measured at 0.00075". Samples were applied over printed graphics and to check for contact clarity and the underlying image came through clearly in all cases.

180° Peel Adhesion using PSTC-1 protocol with 24 hour dwell from stainless steel, treated PET sheet, non-treated Polypropylene sheet and Vinyl sheet. Peel values were measured at 0.9 #/in with clean removability of the adhesive from stainless steel, 1.1 #/in" with clean removal from treated PET, 0.4 #/in" from non-treated Polypropylene and 1.1 #/in" from vinyl with minor cohesive failure.

The Uncoated Cellophane P 400 was noticeably distorted. This was attributed to the moisture sensitivity of the uncoated Cellophane that was saturated with 0.0016" of wet adhesive and the extended period of time it takes to get the lab draw down sheet off of the draw down apparatus and into the lab oven. This does point out the moisture sensitivity of the uncoated Cellophane.

Example 5

In the lab a mixture was prepared as follows using a lab Cowles Dispersing mixer:
Ingredient wt %
Covinax 383-19 Vinyl Acrylic PSA 58% Solids 90.0
Tamol 165A Dispersant 0.8
CT136 Dispersant 0.4
Rice Starch (Nominal 3.5 micron) 4.4
Water 4.4

The resultant coating at a nominal 57% solids was coated onto corona treated 0.0015" clear PET using a #22 lab metering rod and dried in a lab oven.

Adhesive thickness was measured at 0.0012". Samples were applied over printed graphics and to check for contact clarity and the underlying image came through clearly in all cases.

There is slight swelling of the starch particles due to absorption of water and polymer into the starch particle. The water is driven off on drying of the adhesive and it is thought polymer in the starch particle helps link the adhesive matrix together. Care must be taken so the adhesive with starch particles is not heated to the point where the temperature exceeds the gelanization point of the starch at which point the swelling of the starch becomes irreversible and begins to form a gel of the coating matrix.

Example 6

Ingredient wt %
E5590 Acrylic PSA 59.5% Solids 93.4
Tamol 165A Dispersant 0.8
CT136 Dispersant 0.4
Grade A202 2.5 micron Alumina Tri-Hydrate 5.0
Polyfunctional Aziridine CX-100/Water 50/50 Blend 0.4

The resultant coating at a nominal 61% solids was coated onto corona treated 0.0015" clear PET, 0.00087" 320 MF clear Cellophane coated with Nitrocellulose on both sides and 0.0011" Cellotherm P 400 uncoated Cellophane with a #16 lab metering rod and dried in a lab oven.

Adhesive thickness was measured at 0.00065". Samples were applied over printed graphics and to check for contact clarity and the underlying image came through clearly in all cases.

10 samples each, 1" wide by 5" long were applied to glass plated and force aged in a lab oven for 72 hours at 140 degrees F. before they were tested by hand for removability. The samples were peeled (removed) with a slow steady motion and a quick jerk. In all slow steady peel, the label removed cleanly and left no adhesive residue. The PET removed cleanly with the aggressive jerk and 40% of the uncoated raw cellophane and 20% of the Nitrocellulose labels tore and had had to be removed in 2 or 3 pieces but they did remove cleanly without adhesive residue. PET is a stronger film and in this case was thicker so it inherently has more tear strength so this points out that in certain cases, thicker more tear resistant cellophane may be needed along with training on the proper way to remove the affixed label.

The invention claimed is:

1. A method of making a contact clear, durable heat resistant single ply low cost packaging or labeling substrate from a clear heat resistant polymer film selected from the group consisting of polyethylene terephthalate and cellulose said method consisting of:
   (a) positioning a single acrylic pressure sensitive adhesive layer on a bottom surface of said heat resistant polymer film and drying said adhesive layer to form a dry coating matrix on said heat resistant polymer film, wherein the single acrylic pressure sensitive adhesive layer comprises an acrylic pressure sensitive adhesive and from 5-15 wt % of a solid filler selected from the group consisting of alumina trihydrate, clay, and starch, based on weight of the dry coating matrix, where the solid filler is effective to result in an increase in shear strength and reduction in cold flow, creep or ooze properties of said pressure sensitive adhesive layer; and
   (b) positioning a print receiving layer on a top surface of said clear heat resistant polymer film and
   (c) positioning a release liner on a bottom side of said clear heat resistant polymer film.

2. A method of making a contact clear, durable heat resistant single ply low cost packaging or labeling substrate from a clear heat resistant polymer film as defined in claim 1 where the clear heat resistant polymer film is polyethylene terephthalate.

3. A method of making a contact clear, durable heat resistant single ply low cost packaging or labeling substrate from a clear heat resistant polymer film as defined in claim 2 where the solid filler is alumina trihydrate.

4. A method of making a contact clear, durable heat resistant single ply low cost packaging or labeling substrate from a clear heat resistant polymer film as defined in claim 1 where the clear heat resistant polymer film is cellophane.

5. A method of making a contact clear, durable heat resistant single ply low cost packaging or labeling substrate from a clear heat resistant polymer film as defined in claim 4 where the solid filler is alumina trihydrate.

6. A method of making a contact clear, durable heat resistant single ply low cost packaging or labeling substrate from a clear heat resistant polymer film as defined in claim 1 where the acrylic pressure sensitive adhesive layer is from 10-30.5 microns.

7. A method of making a contact clear, durable heat resistant single ply low cost packaging or labeling substrate from a clear heat resistant polymer film as defined in claim 1 where the acrylic pressure sensitive adhesive is biodegradable and/or compostable.

8. A method of making a contact clear, durable heat resistant single ply low cost packaging or labeling substrate from a clear heat resistant polymer film consisting of cellophane film, said method comprising:
   (a) positioning a single acrylic pressure sensitive adhesive layer on a bottom surface of said cellophane film and drying said adhesive layer to form a dry coating matrix on said cellophane film, wherein the single acrylic pressure sensitive adhesive layer comprises an acrylic pressure sensitive adhesive and from 5-15 wt % of alumina trihydrate, based on weight of the dry coating matrix;
   (b) positioning a print receiving layer on a top surface of said clear heat resistant polymer film.

* * * * *